United States Patent [19]

Taniguchi et al.

[11] Patent Number: 4,708,761
[45] Date of Patent: Nov. 24, 1987

[54] LAMINATING APPARATUS FOR PREPREG MATERIALS

[75] Inventors: Akira Taniguchi, Kakamigahara; Kuniji Ojio, Gifu; Tatsuya Yamamoto, Kakamigahara; Toshikazu Sana, Konan, all of Japan

[73] Assignee: Kawasaki Jukogyo Kabushiki Kaisha, Kobe, Japan

[21] Appl. No.: 922,476

[22] Filed: Oct. 23, 1986

[30] Foreign Application Priority Data

Oct. 25, 1985 [JP] Japan ................................ 60-238631

[51] Int. Cl.[4] .............................................. B32B 31/18
[52] U.S. Cl. ..................................... 156/516; 156/517; 156/538; 156/540; 156/554; 156/574; 156/576
[58] Field of Search ............... 156/264, 353, 361, 391, 156/510, 512, 516, 517, 539, 540, 538, 554, 523, 561, 562, 574, 576

[56] References Cited

U.S. PATENT DOCUMENTS

| | | | |
|---|---|---|---|
| 3,992,240 | 11/1976 | Kuehn | 156/510 |
| 4,385,956 | 5/1983 | Pearl | 156/576 |
| 4,419,170 | 12/1983 | Blad | 156/361 |
| 4,508,584 | 4/1985 | Charles | 156/540 |

FOREIGN PATENT DOCUMENTS 45057 3/1983 Japan .

Primary Examiner—Caleb Weston
Attorney, Agent, or Firm—Kerkam, Stowell, Kondracki & Clarke

[57] ABSTRACT

A laminating apparatus for multi-laminating different kinds of prepreg material sheets including roll stocker means provided with a plurality of rolls of different kinds of prepreg material tape on a common axis, lay-up table means movable with respect to said rolls in parallel with the common axis, cutting means for cutting said prepreg material tape into sheets disposed between said roll stocker means and said lay-up table means, pulling out means provided on said lay-up table means to be movable in the longitudinal direction thereof for pulling said prepreg material tape out from said rolls, and compaction head means provided on said lay-up table means for compacting said prepreg material sheet to be movable along the longitudinal direction of said lay-up table means. According to the present invention, it is possible to continuously laminate different kinds of prepreg material sheets in desired order and an automatic laminating operation can be easily accomplished. Further, laminates with continuous length and narrow width can be easily produced.

5 Claims, 9 Drawing Figures

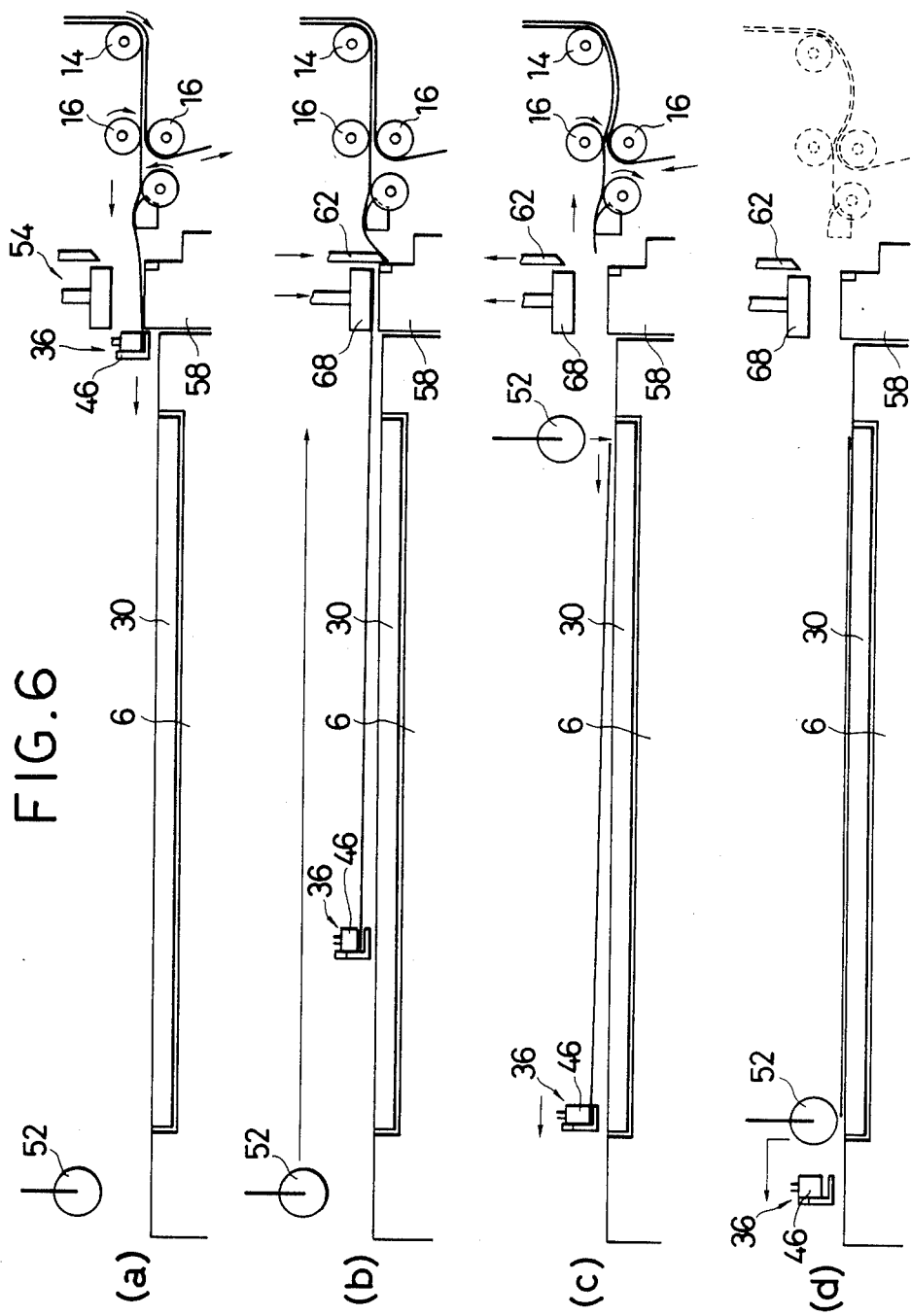

LAMINATING APPARATUS FOR PREPREG MATERIALS

BACKGROUND OF THE INVENTION

The present invention relates to a laminating apparatus for prepreg materials, and more particularly to a laminating apparatus for multi-laminating prepreg materials comprising resin-impregnated fibers used for manufacture of structural members made of composite materials.

DESCRIPTION OF PRIOR ART

There is known a laminating apparatus for multi-laminating a plurality of prepreg material sheets. The prior art laminating apparatus includes a lay-up head movable in arbitrary directions with respect to a lay-up table for supporting prepreg material sheets and provided with a roll of prepreg material tape to be laminated and a cutting device for cutting the prepreg material tape into sheet. It can laminate layers having fibers aligned in uni-direction with other layers having fibers aligned in different directions by pulling out prepreg material tapes having fibers aligned in a longitudinal direction by the lay-up head and moving the lay-up head in the desired direction.

However, since this prior art laminating apparatus is designed to laminate prepreg material sheets having fibers aligned in the longitudinal direction, when the laminates with continuous length and narrow width which have layers having fibers aligned obliquely or transversely with respect to the longitudinal direction are produced, the lay-up head has to be repeatedly moved and the operating efficiency becomes low. Further, in the prior art laminating apparatus, since the lay-up head has a roll of prepreg material tape and the cutting device and is relatively heavy, it is very difficult to increase the moving speed of the lay-up head and thereby the laminating speed.

SUMMARY OF THE INVENTION

It is therefore an object of the present invention to provide a laminating apparatus capable of easily and efficiently multi-laminating different kinds of prepreg material sheets with continuous length and narrow width.

It is a further object of the present invention to provide a laminating apparatus in which multi-laminates of prepreg material sheets can be automatically produced.

In the present application, the different kinds of prepreg material sheets to be laminated include at least two kinds of prepreg material sheets selected from a group comprising a prepreg material sheet having fibers aligned in the longitudinal direction, a prepreg material sheet having fibers aligned in the direction with an angle of 45 degree to the longitudinal direction woven with fibers aligned in the direction with an angle of 135 degree of the longitudinal direction, a prepreg material sheet having fibers aligned in the longitudinal direction and those aligned in the direction with an angle of 45 degree to the longitudinal direction and those aligned in the direction with an angle of 135 degree to the longitudinal direction, a prepreg material sheet having fibers aligned in the longitudinal direction and those aligned in the lateral direction, and a prepreg material sheet having fibers aligned in the longitudinal direction woven with those aligned in the lateral direction. Further, the fibers contained in at least a part of the prepreg material sheets may be made of different kinds of materials than those contained in others.

According to the present invention, the above and other objects can be accomplished by a laminating apparatus for multi-laminating different kinds of prepreg material sheets including roll stocker means provided with a plurality of rolls of different kinds of prepreg material tape on a common axis, lay-up table means disposed so as to face said roll stocker means at one end thereof, said rolls and said lay-up table means being movable with respect to each other in parallel with the common axis, cutting means for cutting said prepreg material tape into sheets disposed between said roll stocker means and said lay-up table means, pulling out means provided on said lay-up table means to be movable in the longitudinal direction thereof for pulling said prepreg material tape out from said rolls, and compaction head means provided on said lay-up table means for compacting said prepreg material sheet to be movable along the longitudinal direction of said lay-up table means independently of the movement of said pulling out means.

According to the aforementioned features of the present invention, it is possible to continuously laminate different kinds of prepreg material sheets in desired order and an automatic laminating operation can be easily accomplished. Further, laminates with continuous length and narrow width can be easily produced. Furthermore, since rolls of prepreg material tape to be laminated and the cutting means for cutting the prepreg material tape into sheet are provided independently of the pulling out means for pulling out the prepreg material tape from the roll, the high speed laminating can be fulfilled.

BRIEF DESCRIPTION OF THE DRAWINGS

FIGS. 6a, 6b, 6c and 6d are schematic drawings showing operations of the laminating apparatus described in FIGS. 1 to 5.

DESCRIPTION OF THE PREFERRED EMBODIMENT

A preferred embodiment of the present invention will be described hereinbelow.

Figure 1:
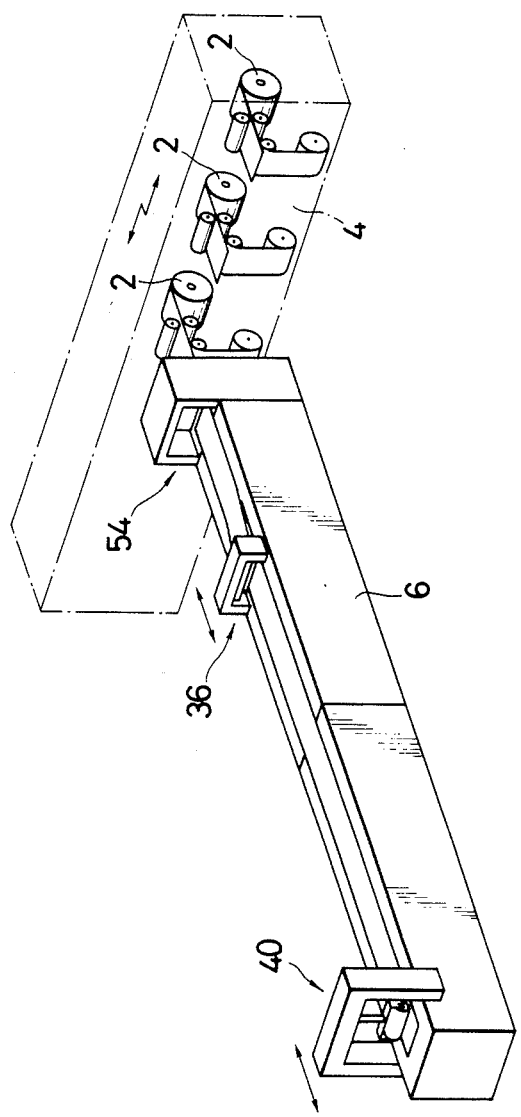
FIG. 1 is a schematic drawing showing a perspective view of an embodiment of the laminating apparatus of the present invention and FIG. 2 is a schematic drawing showing a vertical cross-sectional view thereof.
Figure 2:
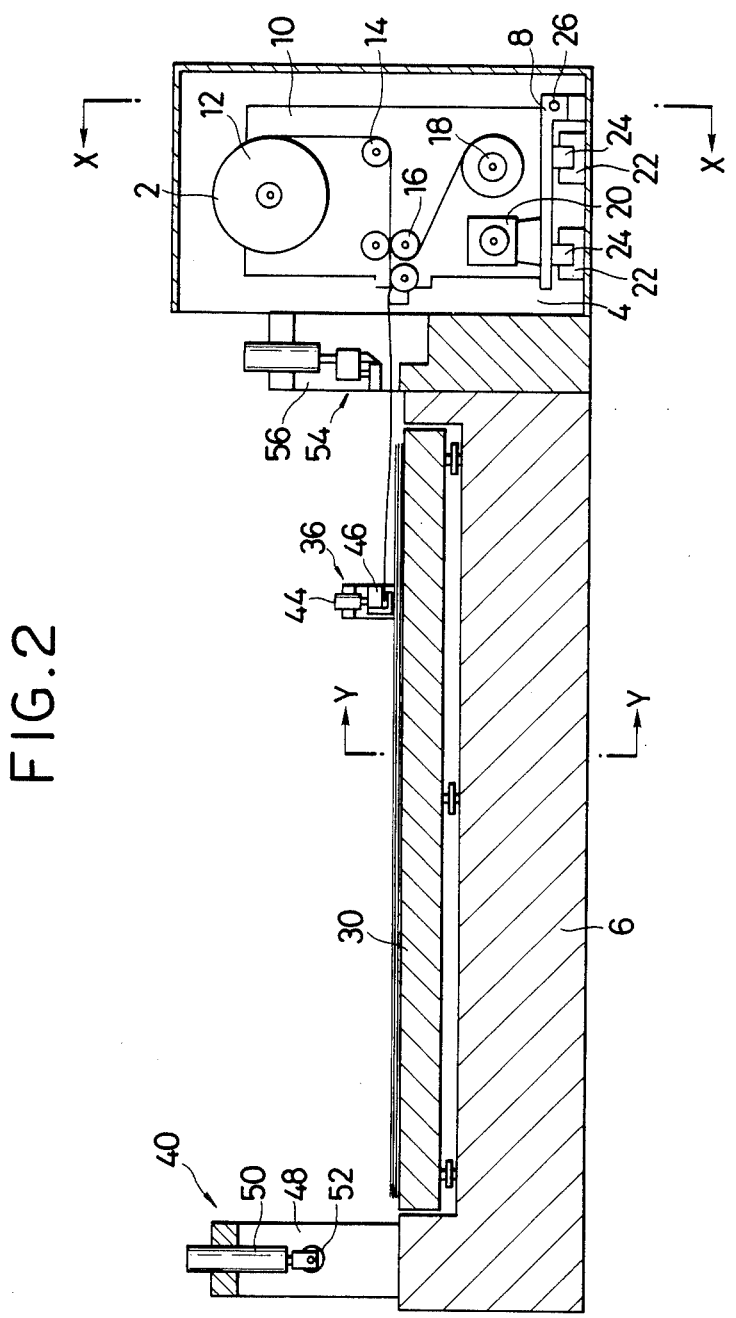
Figure 3:
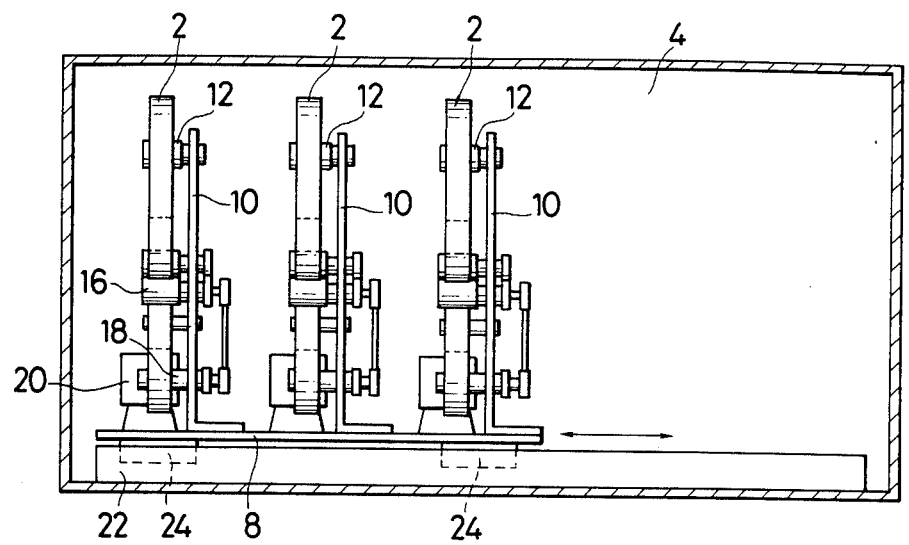
FIG. 3 is a schematic drawing showing a crosssectional view taken along line X—X of FIG. 2.

Referring to the FIG. 1, there is shown a laminating apparatus consisting of a roll stocker 4 having two or more rolls 2 of a prepreg material tape therein and a lay-up table 6 extending perpendicularly with respect to the roll stocker. The axes of the rolls 2 are aligned each other in the roll stocker 4. Referring to FIGS. 2 and 3, each roll 2 is rotatably supported by a shaft 12 fixed on a supporting plate 10 secured to a movable table 8. The roll 2 is formed of prepreg material tape backed with a backing paper. A guide roller 14 for guiding the tape to a pulling out portion and a pair of feed rollers 16 for feeding the prepreg material to the pulling out portion are disposed on the supporting plate 10 below the shaft 12. Further, a backing paper winding roller 18 is disposed below the guide roller 14. As the roll of prepreg material is unwound, it is redirected by the guide roller 14 and fed to the pulling out portion by the feed roller 16. The backing paper is removed by the feed roller 16 and wound on a wind-up roller 18. The feed rollers 16 and the wind-up roller 18 are driven by a motor 20 disposed on the movable table 8.

A pair of guide rails 22 are arranged in the roll stocker 4 and slide shoes 24, each being slidable within one of the guide rail 22, are secured to the movable table 8. As a result, the movable table 8 and therefore the rolls 2 can be moved parallel to the guide rails 22. As shown in Figure 2, a screw shaft 26 is engaged with the movable table 8. The screw shaft 26 is driven by a motor (not shown) so that the movable table 8 can be moved in either direction along the guide rail 22 by selecting the direction of rotation of the screw shaft 26.

Figure 4:
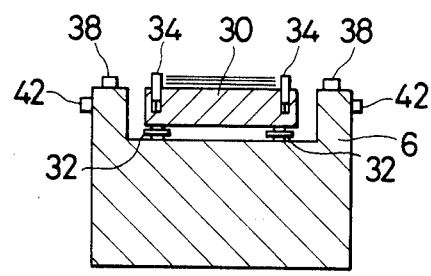
FIG. 4 is a schematic drawing showing a crosssectional view taken along line Y—Y of FIG. 2.

The lay-up table 6 is disposed so that longitudinal direction is perpendicular to the direction of movement of the movable table 8. As shown in FIG. 4, a lay-up tool 30 provided with level adjusting legs 32 at the bottom thereof lies on the lay-up table 6 supported by the legs 32. The lay-up tool 30 is provided with a pair of guide means 34 for guiding the sheets of prepreg material cut to size by a cutting device 54 to be described later.

A puller 36 is provided to be movable in the longitudinal direction of the lay-up table 6 for holding one end of the prepreg material tape and pulling it onto the lay-up tool 30. As shown in FIG. 4, a pair of guide rails 38 are for guiding the puller 36 are provided on the upper surface at opposite sides of the lay-up table 6. The puller 36 is moved along the guide rails 38 by a motor (not shown). Further, a compaction head 40 is disposed on the lay-up table 6 for compacting the sheet of prepreg material placed on the lay-up tool 30 to remove trapped air. A pair of guide rails 42 for guiding the compaction head 40 in the longitudinal direction of the lay-up table 6 are provided on opposite side surfaces of the lay-up table 6. The compaction head 40 is moved along the guide rails 42 by a motor (not shown). The puller 36 is provided with a holding head 46 actuated by an air cylinder 44 and the prepreg material sheet is held by the holding head 46 by one end thereof. The compaction head 40 has a frame 48 straddling the puller 36 and the frame 48 is provided with an air cylinder 50 and a compaction roller 52 is secured to the end of a piston rod (not shown) of a piston (not shown) slidable within the air cylinder 50.

Figure 5:
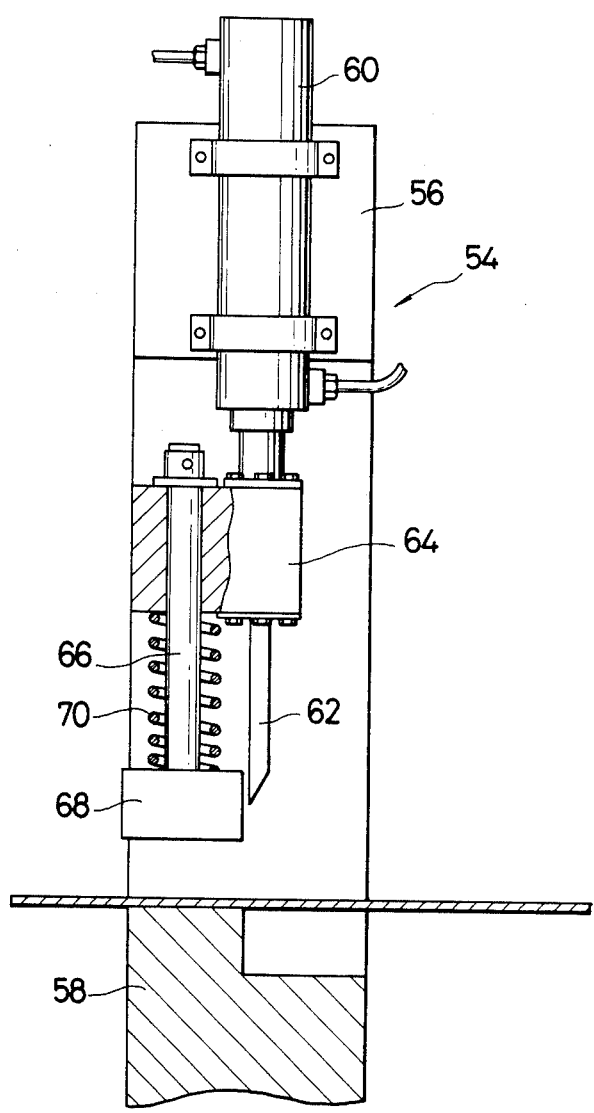
FIG. 5 is a schematic drawing showing an enlarged detailed cross-sectional view of a cutting device.

A cutting device 54 for cutting the prepreg material tape is provided at the end of the lay-up table 6 facing the roller stocker 4. As shown in FIG. 5, the cutting device 54 has a frame 56 secured to the end of the lay-up table 6 and a tape compaction table 58 is secured to the frame 56. An air cylinder is disposed above the tape compaction table 58 and a block 64 supporting a cutter 62 is secured to the end of the piston rod (not shown) of a piston (not shown) slidable within the air cylinder 60. The block 64 is provided with a vertically movable compaction bar 66 having a compaction block 68 at the lower end thereof. During a cutting operation of the prepreg material tape, the tape is held by compacting the compaction block 68 toward the tape compaction table 58. For this purpose, the compaction block 68 is urged toward the lower portion by a spring 70. Consequently once the air cylinder 60 is actuated, the block 64 is lowered together with the cutter 62 and the compaction block 68 and the compaction block 68 is urged to compact against the tape compaction table 58 to hold the prepreg material tape. Next, as the block is lowered further, the cutter 62 descends to cut the prepreg material tape.

MODE OF OPERATION

Referring to FIGS. 6a, 6b, 6c and 6d, and operation of the laminating apparatus will be described hereinbelow.

Referring to FIG. 6a, the movable table 8 is moved by driving the screw shaft 26 so that the roll 2 comprising a prepreg material tape is positioned to face the lay-up table 6. Then, the puller 36 is moved to a position facing the end of the roll stocker 4 and the feed roller 16 is actuated to pull the prepreg material tape out from the roll 2 and forward one end of the tape to the holding head 46 of the puller 36 to be held thereby. Then, with the feed roller 16 actuated, the puller 36 is moved away from the roll stocker 4 in the longitudinal direction of the lay-up table 6, whereby the prepreg material tape is pulled out onto the lay-up tool 30. During this step, the backing paper is removed from the prepreg material tape and wound up by the wind-up roller 18.

After a predetermined length of the prepreg material tape has been fed out, the puller 36 is stopped. Then, as shown in FIG. 6b, the cutting device 54 is actuated and the prepreg material tape held by the compaction block 68 is cut by the cutter 62. During this operation, the compaction head 40 is moved toward the roll stocker 4 in the longitudinal direction of the lay-up table 6.

When the cutter operation of the prepreg material tape is completed, the puller 36 is moved to the end of the lay-up table 6 opposite to the roll stocker 4 to position the end of the prepreg material sheet produced by cutting the prepreg material tape at the end of the lay-up table 6 facing the roll stocker 4. Then, the air cylinder 50 of the compaction head 40 is actuated to press the compaction roller 52 ontot he pulled-out prepreg material sheet and the compaction head 40 is moved in the longitudinal direction of the lay-up table 6 toward the end of the lay-up table 6 opposite from the roll stocker 4 while the compaction roller 52 is pressed onto the sheet. And at an appropriate timing, the prepreg material sheet is released by actuating the holding head 46 of the puller 36 and one cycle of the process is completed when the compaction roller 52 reaches the end of the prepreg material sheet opposite to the roll stocker 4. The above described process is illustrated in FIGS. 6c and 6d. Further, the same steps are repeated by selecting other rolls 2 of prepreg material tape.

The present invention has thus been shown and described with reference to a specific embodiment. However, it should be noted that the present invention is in no way limited to the details of the described arrangement but changes and modifications may be made without departing from the scope of the appended claims.

We claim:

1. A laminating apparatus for multi-laminating different kinds of prepreg material sheets including roll stocker means provided with a plurality of rolls of different kinds of prepreg material tape on a common axis, lay-up table means disposed so as to face said roll stocker means at one end thereof, said rolls and said lay-up table means being movable with respect to each other in parallel with the common axis, cutting means for cutting said prepreg material tape into sheets disposed between said roll stocker means and said lay-up table means, pulling out means provided on said lay-up table means to be movable in the longitudinal direction thereof for pulling said prepreg material tape out from said rolls, and compaction head means provided on said lay-up table means for compacting said prepreg material sheet to be movable along the longitudinal direction of said lay-up table means independently of the movement of said pulling out means.

2. A laminating apparatus in accordance with claim 1 in which said rolls are aligned in the longitudinal direction of said roll stocker means.

3. A laminating apparatus in accordance with claim 1 in which said prepreg material tape is backed with backing paper.

4. A laminating apparatus in accordance with claim 1 in which said pulling out means is provided with holding means for holding one end of said prepreg material tape to pull it out.

5. A laminating apparatus in accordance with claim 1 in which said cutting means is provided with press block means for pressing and holding said prepreg material tape during the cutting operation.

* * * * *